3,082,188
STABILIZED POLYOLEFIN COMPOSITIONS
Andrew J. Dietzler and Charles L. Stacy, Jr., Midland, Mich., assignors to The Dow Chemical Company, Midland, Mich., a corporation of Delaware
No Drawing. Filed Feb. 24, 1959, Ser. No. 794,818
1 Claim. (Cl. 260—45.95)

This invention relates to non-toxic compositions of polyethylene and like normally solid polymers of non-aromatic hydrocarbon olefin monomers which compositions are stable against thermal oxidation.

The present application is a continuation-in-part of the copending application for United States Letters Patent having Serial No. 536,014, which was filed on September 22, 1955, now abandoned.

A variety of materials have been utilized for stabilizing polyethylene and the like non-aromatic hydrocarbon polyolefins to thermal oxidation. Unfortunately, however, the efficient stabilizers for such polyolefins have toxic physiological effects when they are ingested by human beings. Thus such effective stabilizers for polyethylene as 2,2'-methylene bis(4-methyl, 6-tert-butyl phenol) and di-β-naphthyl-p-phenylene diamine cannot safely be employed in the manufacture of articles intended for food packaging and other applications where toxicity is a significant consideration.

There are known non-toxic materials which can be employed to stabilize non-aromatic hydrocarbon olefin polymers to a limited degree to thermal oxidation. These materials are not completely satisfactory when individually employed due to their relatively low order of efficiency and effectiveness for such purpose. Butylated hydroxy toluene is an example of a non-toxic material which has been utilized as an antioxidant for polyethylene despite its relative inefficiency in such capacity.

It would be advantageous for non-aromatic, hydrocarbon polyolefin compositions to be efficiently stabilized to thermal oxidation with efficient and effective non-toxic antioxidants. It would be more advantageous if the antioxidants having non-toxic characteristics were also non-staining materials for the polyolefin compositions. This would permit employing stabilized polyethylene, polypropylene and the like polyolefin compositions without hesitancy for food packaging applications and for other uses where the employment of materials having toxic characteristics would be prohibited and where an attractive appearance would be a desirable asset.

According to the present invention, a non-toxic and non-staining polyolefin composition is comprised of (A) a normally solid non-aromatic, hydrocarbon polyolefin, such as polyethylene, polypropylene, etc., and (B) a minor proportion of an antioxidant that is a bis-phenol of the formula:

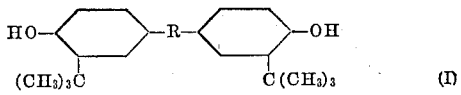

wherein R represents a structure containing a cyclic radical selected from the group consisting of benzylidene, cyclohexylidene, cyclopentylidene and alkyl substitution products thereof wherein the alkyl group contains from 1 to 4 carbon atoms, inclusive.

The bis-phenol products used as antioxidants in the practice of the present invention are crystalline solids which are soluble in many common organic solvents such as benzene, toluene, alcohol and of very low solubility in water.

These bis-phenols may be prepared by the reaction of 2-tertiary-butylphenol with an appropriate ring-containing carbonyl compound. Suitable carbonyl compounds are cyclic ketones and ring-containing aldehyde. Examples of suitable carbonyl compounds are cyclohexanone, cyclopentanone, 4-tertiary-butylcyclohexanone, 4-methylcyclohexanone, benzaldehyde, 4-tertiary-butylbenzaldehyde, m-tolualdehyde, p-tolualdehyde, 2-methylcyclopentanone, 2-methyl-4-isopropylbenzaldehyde, 4-isopropylbenzaldehyde, 3-methylcyclohexanone, 3-methylcyclopentanone, 2-ethylcyclopentanone, 3-isopropylcyclopentanone and 4-isopropylcyclohexanone.

The reaction takes place smoothly in the temperature range of from 10° to 50° C. Good results are obtained when a substantial excess of the 2-tertiary-butylphenol reactant is employed. Preferred ratio of reactants are from 4 to 8 molar proportions of the 2-tertiary-butylphenol reactant per mole proportion of the cyclic ketone or aldehyde. The reaction is carried out in the presence of a hydrogen halide catalyst, e.g. hydrogen chloride or hydrogen bromide. Preferred procedures include saturating the reaction mixture with anhydrous halogen halide. The reaction may be carried out in the presence of a small amount of "ionizable sulfur compound" as promoter. The use of a promoter is particularly desirable when a ketone is employed as a reactant. Suitable promoters include hydrogen sulfide and alkyl mercaptans such as octanethiol. The amount of the promoter employed corresponds to from 0.03 to 0.2 gram atom of sulfur per mole of ketone.

In the preferred method of carrying out the reaction, the appropriate aldehyde or ketone and 2-tertiary-butylphenol and an ionizable sulfur compound, if employed, are mixed together and anhydrous hydrogen halide passed into the mixture to saturate or substantially saturate the mixture with respect to hydrogen halide. During the addition of hydrogen halide, the mixture is stirred and the temperature maintained in the range of from 20° to 40° C. After completion of the addition, the mixture is allowed to stand at room temperature for from 1 to 11 days to produce the desired bisphenol product.

The desired bis-phenol product for use as a polyolefin antioxidant may be recovered as by extraction, washing and distillation. In a preferred procedure, nitrogen is passed through the reacted mixture at 60° C. for a period of from 1.5 to 2.5 hours to remove the hydrogen halide. The blown mixture is then heated to distill the water of reaction, unreacted starting materials and the promoter, if employed. The residue is then treated by passing steam therethrough at a temperature of 150°–170° C. at 25–35 millimeters pressure to volatilize any remaining phenol and to obtain as residue the desired bisphenol product. The latter may be dried in the usual ways such as by heating in a vacuum oven or by passing thereover a stream of inert gas such as nitrogen. The product may be purified, if desired, by recrystallization from solvents such as chlorobenzene or ethylcyclohexane.

Where an aldehyde is employed as a reactant, an alternative reaction method may be employed. In such a method, dry hydrogen halide is passed into cooled, stirred liquid 2-tertiary-butylphenol. The appropriate aldehyde is then added dropwise with stirring while the temperature is maintained at between 10° and 25° C. After the addition is complete, stirring is continued for several hours without cooling. The temperature may rise to 35° C. during this period. The mixture is then allowed to stand for several days at room temperature to produce the desired bisphenol. The latter may be recovered and purified in a manner similar to that above described.

An amount of antioxidant between about 0.005 and 2.0 weight percent, based on the weight of the polyolefin, may advantageously be incorporated in the composition to render it stable to thermal oxidation. Ordinarily an amount of about 0.1 percent by weight may be satisfactorily employed.

Among the 4,4'-bis-phenol compounds which may be employed in the practice of the present invention are 4,4'-cyclohexylidene-bis-(2-tert.-butyl phenol); 4,4'-benzylidene-bis-(2-tert.-butyl phenol); 4,4'-(4-tert.-butylcyclohexylidene)-bis-(2-tert.-butyl phenol); 4,4'-cyclopentylidene-bis-(2-tert.-butyl phenol); 4,4'-(3,5-dimethyl-benzylidene)-bis-(2-tert.-butyl phenol); and the like.

As indicated, any of the normally solid polymers of non-aromatic, hydrocarbon mono- (or 1-) olefin monomers may be beneficially stabilized by practice of the present invention, including any of those prepared from such olefin monomers of from 2 to about 6 carbon atoms. The utilized polymers may be the recently-available linear, macromolecular, high density species or, as in the case of "polythene"-type polyethylene, may be branch structured materials. Thus, in addition to polyethylene and polypropylene, such polyolefins as polybutylene, copolymers of ethylene and propylene, and the like may be employed.

Polyethylene, polypropylene and the like compositions stabilized according to the present invention are non-toxic and may be employed in articles for food packaging and in other applications where it is necessary to avoid complications due to toxicity.

The following table illustrates the effectiveness of the antioxidants in "polythene"-type, conventional branch structured polyethylene compositions according to the present invention. In each case a numerical value represents the relative degree of stabilization to thermal oxidation of the particular composition indicated. The relative degree of stabilization for each sample was determined by exposing it to oxygen at a temperature of about 150° C. and observing its stability to thermal oxidation.

Thus, in a series of representative operations, the polyethylene and 0.1 percent by weight of certain of the bis-phenol compounds (based on the weight of polyethylene) were dissolved in o-xylene to form a solution containing 40 percent by weight of polyethylene. This solution was cast on clear glass plates to form 30 mil films. Test discs 1.75 inches in diameter were cut from the films and employed to determine the effect of the bis-phenols in inhibiting the absorption of oxygen by polyethylene. The inhibiting effect was determined by maintaining the disc in contact with gaseous oxygen recirculated thereover at a rate of 500 milliliters per minute at a temperature of 150° C. and 760 millimeters absolute pressure, employing a procedure similar to that described by R. H. Dornte, Ind. Eng. Chem., vol. 28, pp. 26–30, 1936, for determining the oxidation of white oils. The volume of the oxygen was measured at regular intervals of time and the change in volume of oxygen, i.e., the volume of oxygen absorbed was plotted against time. After the volume change per unit of time became constant measurements were discontinued. A smooth curve was drawn and extrapolated to zero. The time at zero absorption of oxygen represents the induction time or the time for which the added agents was effective in inhibiting oxidation of polyethylene and is a measure of the antioxidative properties of the compound.

The table also includes values given by "Ionol," a known proprietary antioxidant having the precise composition 2,6-di-tert.-butyl-6-methyl-phenol; 4,4'-cyclohexylidenediphenol; and 4,4'-benzylidenediphenol.

Table

| Stabilizing compound: | Induction time (hours) |
|---|---|
| "Ionol" | 3.8 |
| 4,4'-cyclohexylidenediphenol | 3.8 |
| 4,4'-benzylidenediphenol | 5.7 |
| 4,4'-cyclohexylidenebis(2-tertiary-butylphenol) | 28.4 |
| 4,4' - (4 - tertiary - butylcyclohexylidene)bis(2-tertiary-butylphenol) | 27.2 |
| 4,4'-benzylidenebis(2-tertiary-butylphenol) | 23.8 |
| Unstabilized polyethylene (blank) | 1.1 |

Results at least commensurate with those above indicated are obtained using any other of the antioxidants of the Formula I in the polyethylene, or when any of the bis-phenol antioxidants of the present invention are employed in such polyolefins as linear, macromolecular polyethylene, such as that obtained by the Ziegler process or "Marlex"; polypropylene, solid copolymers of propylene and ethylene (such as one containing about equal mole percentages of each monomer polymerized in the polyolefin polymer, polybutylene, and so forth.

As is apparent in the table, the unstabilized polyethylene had a degree of stabilization according to this procedure of about 1.1. In comparison, the same polyethylene stabilized with the conventionally employed toxic stabilizers had degrees of stabilization between about 10 and 140. A degree of stabilization of at least about 5 and preferably more than 10 is generally indicative of an entirely satisfactorily stabilized polyethylene composition.

It is significant that many of the non-toxic stabilized compositions of the present invention have superior degrees of stabilization in comparison to conventionally stabilized compositions. This renders them especially desirable for polyethylene, polypropylene and the like polyolefin applications, in general, whenever a highly stabilized material is required. In addition, they can also be employed in other applications where their nontoxicity is not a vital characteristic. For example, it may also be advantageous, in many instances to utilize the non-staining properties of the antioxidant materials in these compositions.

What is claimed is:

A non-toxic polyolefin composition which is stabilized to thermal oxidation which comprises a major proportion of polyethylene and between about 0.005 and 2 weight percent based on the weight of the composition of 4,4'-benzylidene-bis-(2-tertiary-butylphenol).

References Cited in the file of this patent

UNITED STATES PATENTS

| 2,434,662 | Latham et al. | Jan. 20, 1948 |
| 2,883,365 | Mathes | Apr. 21, 1959 |
| 2,889,306 | Hawkins et al. | June 2, 1959 |
| 2,894,004 | Dietzler | July 7, 1959 |

FOREIGN PATENTS

| 470,325 | Canada | Dec. 26, 1950 |

OTHER REFERENCES

Briggs et al.: Modern Plastics, vol. 31, pages 121–124, September 1953.